(12) United States Patent
Ton et al.

(10) Patent No.: US 12,664,191 B1
(45) Date of Patent: Jun. 23, 2026

(54) APPARATUS AND METHOD FOR AUTOMATED EVALUATION OF TECHNICAL STANDARDS RELEVANT TO A PRODUCT

(71) Applicant: Element Materials Technology Limited, London (GB)

(72) Inventors: Jean-Claude Ton, Zurich (CH); Christopher Smith, Sherman Oaks, CA (US); Anton Fortunatov, Merstham (GB)

(73) Assignee: Element Materials Technology Limited, London (GB)

( * ) Notice: Subject to any disclaimer, the term of this patent is extended or adjusted under 35 U.S.C. 154(b) by 187 days.

(21) Appl. No.: 18/431,849

(22) Filed: Feb. 2, 2024

(51) Int. Cl.
| | |
|---|---|
| G06F 40/284 | (2020.01) |
| G06F 16/334 | (2025.01) |
| G06F 16/36 | (2019.01) |
| G06F 40/30 | (2020.01) |

(52) U.S. Cl.
CPC ........ G06F 16/3344 (2019.01); G06F 16/367 (2019.01); G06F 40/284 (2020.01); G06F 40/30 (2020.01)

(58) Field of Classification Search
CPC ........ G06F 40/30; G06F 40/279; G06F 40/56; G06F 40/40; G06F 40/20; G06F 40/284; G06F 40/205; G06F 40/216; G06F 40/295; G06F 40/237; G06F 40/242; G06F 40/247; G06F 40/35; G06F 16/3344; G06F 16/3329; G06F 16/338; G06F 16/9537; G06F 16/258; G06F 16/252; G06F 16/248; G06F 16/2471; G06F 16/2457; G06F 16/2448; G06F 16/383; G06F 16/335; G10L 15/063; G10L 15/1815; G10L 15/22; G10L 15/1822; G10L 15/183; G10L 15/30; G10L 17/22
USPC .............................................. 704/9
See application file for complete search history.

(56) References Cited

U.S. PATENT DOCUMENTS

| | | | | |
|---|---|---|---|---|
| 8,892,446 B2 * | 11/2014 | Cheyer | .................. | G10L 15/22 |
| | | | | 704/251 |
| 10,276,170 B2 * | 4/2019 | Gruber | ................ | G06F 16/9537 |
| 10,776,579 B2 * | 9/2020 | Mishra | .................. | G06F 40/205 |
| 11,151,320 B1 * | 10/2021 | Taylor | .................. | G06F 40/279 |
| 11,188,580 B2 * | 11/2021 | Osmon | .................. | G06F 40/30 |
| 11,429,876 B2 * | 8/2022 | Bangalore | ................ | G06N 5/02 |
| 11,977,854 B2 * | 5/2024 | Tunstall-Pedoe | .... | G06N 3/0442 |
| 11,989,507 B2 * | 5/2024 | Tunstall-Pedoe | ... | G06F 16/3344 |
| 11,989,527 B2 * | 5/2024 | Tunstall-Pedoe | ....... | G06F 40/35 |
| 12,007,963 B1 * | 6/2024 | Rajagopalan | ......... | G06F 16/252 |
| 12,073,180 B2 * | 8/2024 | Tunstall-Pedoe | ..... | G06F 40/279 |

(Continued)

*Primary Examiner* — Vijay B Chawan

(74) *Attorney, Agent, or Firm* — Cooley LLP

(57) ABSTRACT

A non-transitory computer readable storage medium has instructions executed by a processor to utilize natural language processing operations to produce technology standard document segments from a technology standard document. The technology standard document segments are converted to a knowledge graph characterizing relationships between the technology standard document segments. The structure of the knowledge graph, regulatory compliance rules and product information are utilized to derive large language model prompts for technology standard document segments. Output from the large language model is used to form probability ratings of requirements to test the product.

6 Claims, 5 Drawing Sheets

(56)          References Cited

U.S. PATENT DOCUMENTS

| | | | | |
|---|---|---|---|---|
| 12,135,740 | B1 * | 11/2024 | Yu ........................ | G06F 16/3329 |
| 12,216,996 | B2 * | 2/2025 | Hoang ..................... | G06N 5/02 |
| 12,353,827 | B2 * | 7/2025 | Tunstall-Pedoe ....... | G06F 40/20 |
| 12,430,503 | B2 * | 9/2025 | Tunstall-Pedoe ... | G06F 16/3344 |
| 2021/0097096 | A1 * | 4/2021 | Osmon ................ | G06F 40/284 |
| 2021/0326532 | A1 * | 10/2021 | Taylor ................ | G06F 16/3344 |
| 2023/0134798 | A1 * | 5/2023 | Hoang ..................... | G06N 3/08 |
| | | | | 704/9 |
| 2023/0141200 | A1 * | 5/2023 | Taylor ................ | G06F 16/3344 |
| | | | | 704/9 |
| 2023/0325422 | A1 * | 10/2023 | Sullivan ................ | G06F 40/117 |
| 2024/0193192 | A1 * | 6/2024 | Reilly, IV ........... | G06F 16/3344 |
| 2024/0370517 | A1 * | 11/2024 | DeVos ................... | G06F 40/30 |
| 2025/0111192 | A1 * | 4/2025 | Bayless ................... | G06N 3/006 |
| 2025/0117128 | A1 * | 4/2025 | Omoigui ............... | G06F 3/0482 |
| 2025/0131212 | A1 * | 4/2025 | Yu ......................... | G06F 40/284 |
| 2025/0173586 | A1 * | 5/2025 | Hubauer ............... | G06F 40/237 |
| 2025/0252262 | A1 * | 8/2025 | Li ......................... | G06F 18/214 |

* cited by examiner

Supply Prompts for Characterization of Product — 200

Identify Relevant Standards For Product — 202

NLP of Relevant Standards — 204

Construct Knowledge Graph — 206

Prepare LLM Prompts — 208

Form Ranked Requirements To Test Product — 210

300

4.1 General requirements

Clause 4 of the general standard applies except as follows.

201.4.3 ESSENTIAL PERFORMANCE

*Additional subclause:*

201.4.3.101 Additional ESSENTIAL PERFORMANCE requirements

Additional ESSENTIAL PERFORMANCE requirements are found in the subclauses listed in Table 201.101.

Table 201.101 -- Distributed ESSENTIAL PERFORMANCE requirements

| Requirement | Subclause |
|---|---|
| Accuracy tests for VOLUMETRIC INFUSION CONTROLLERS, VOLUMETRIC INFUSION PUMPS and SYRINGE OR CONTAINER PUMPS | 201.12.1.102 |
| Accuracy tests for infusion pumps for AMBULATORY USE type 1 | 201.12.1.103 |
| Accuracy tests for infusion pumps for AMBULATORY USE type 2 | 201.12.1.104 |
| Accuracy tests for INFUSION PUMP type 3 | 201.12.1.105 |
| Accuracy tests for INFUSION PUMP type 4 | 201.12.1.106 |
| Accuracy tests for INFUSION PUMP type 5 | 201.12.1.107 |
| Protection against UNINTENDED BOLUS volumes and occlusion | 201.12.4.4.104 |
| ALARM SIGNALS of HIGH PRIORITY according to Table 208.101 | 208.6.1.2.101 |

NOTE  For ALARM CONDITIONS resulting from ME EQUIPMENT failure no EMC and environmental testing is necessary.

302

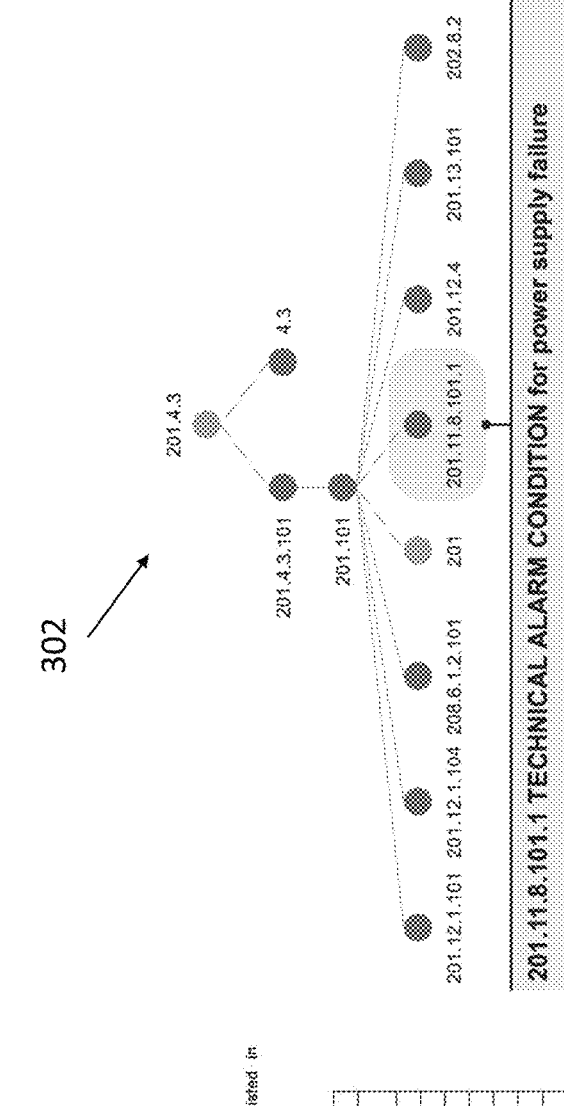

201.11.8.101.1 TECHNICAL ALARM CONDITION for power supply failure

FIG. 3

201.7.9.2 Instructions for use

*Additional subclause:*

201.7.9.2.101 Additional instructions for use

The instructions for use shall also include the following:

alarm(s) and the operational safety of the ME EQUIPMENT;

– data as evaluated by the test methods of 201.12.1.102 to 201.12.1.109 the rates indicated in Table 201.102, including an expir... ...TOR of the data presentation;

201.12.1.104 Accuracy tests for INFUSION PUMP FOR AMBULATORY USE type 2

The test apparatus shown in Figure 201.104b is used. Carry out the tests using a test solution of ISO 3696:1987 class III or a liquid which can be expected to give similar test results and installing an unused ADMINISTRATION SET. Set up the ME EQUIPMENT in accordance with the MANUFACTURER's instructions for use. Prime the ADMINISTRATION SET.

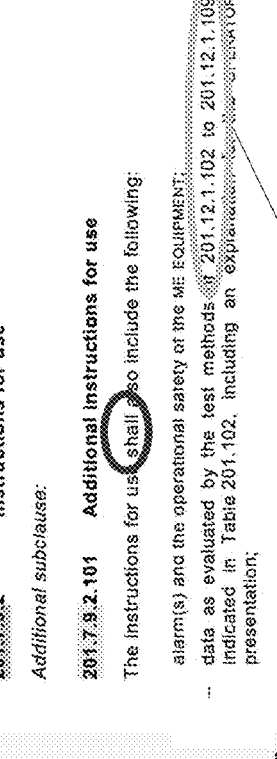

FIG. 4

APPARATUS AND METHOD FOR AUTOMATED EVALUATION OF TECHNICAL STANDARDS RELEVANT TO A PRODUCT

FIELD OF THE INVENTION

This invention relates generally to machine interactions in a computer network. More particularly, this invention relates to automated evaluation of technical standards relevant to a product.

BACKGROUND OF THE INVENTION

A commercial product may be subject to various technical standards. A vendor of such a commercial product must identify subject matter experts that can advise them on relevant technical standards and testing that must be satisfied in accordance with the relevant technical standards. This approach is time consuming, expensive, and not scalable. Thus, there is a need for automated evaluation of technical standards relevant to a product.

SUMMARY OF THE INVENTION

A non-transitory computer readable storage medium has instructions executed by a processor to utilize natural language processing operations to produce technology standard document segments from a technology standard document. The technology standard document segments are converted to a knowledge graph characterizing relationships between the technology standard document segments. The structure of the knowledge graph, regulatory compliance rules and product information are utilized to derive large language model prompts for technology standard document segments. Output from the large language model is used to form probability ratings of requirements to test the product.

BRIEF DESCRIPTION OF THE FIGURES

The invention is more fully appreciated in connection with the following detailed description taken in conjunction with the accompanying drawings, in which:

FIG. 3 illustrates a knowledge graph produced in accordance with an embodiment of the invention.

FIG. 4 illustrates a knowledge graph produced in accordance with an embodiment of the invention.

Like reference numerals refer to corresponding parts throughout the several views of the drawings.

DETAILED DESCRIPTION OF THE INVENTION

Figure 1:
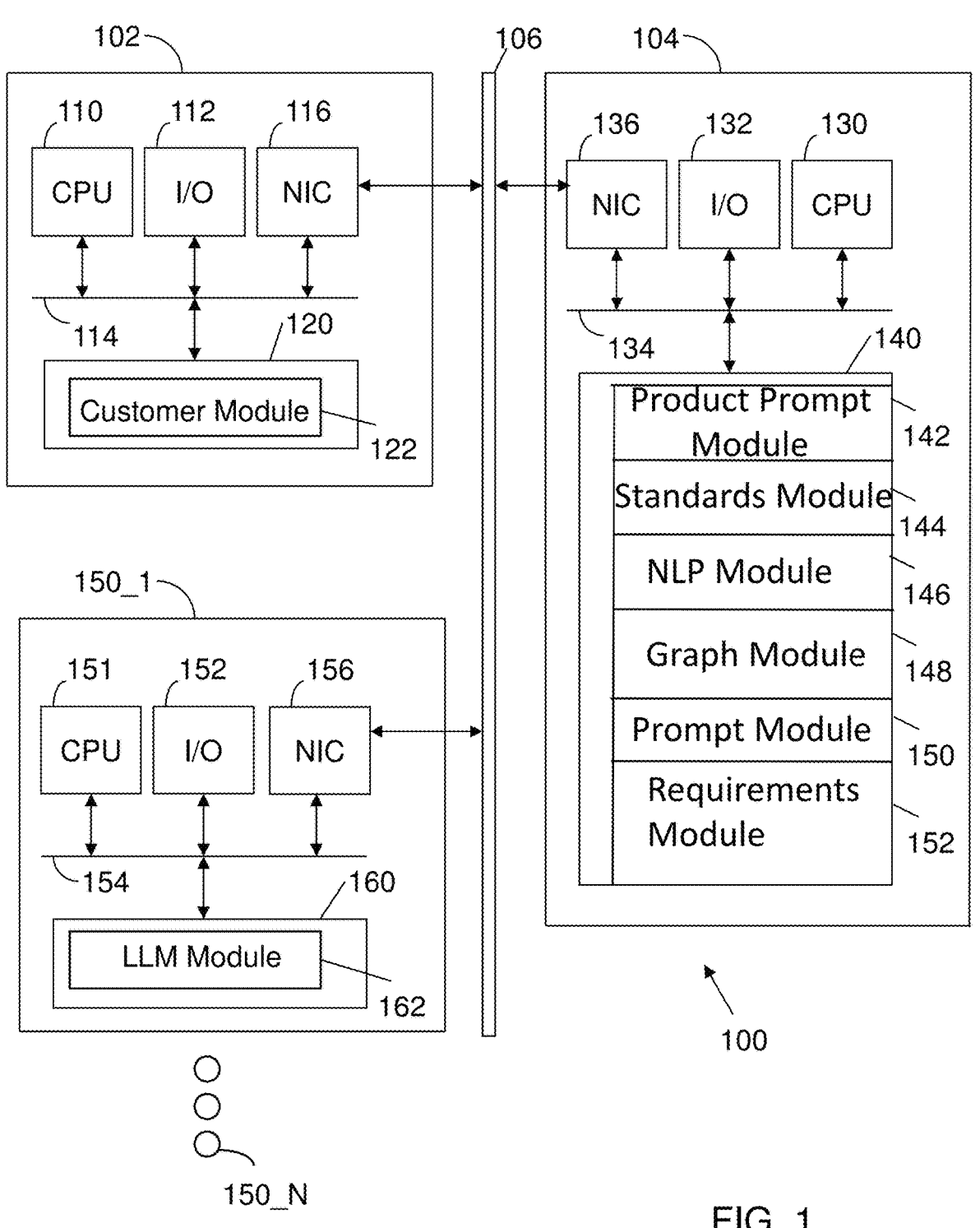
FIG. 1 illustrates a system configured in accordance with an embodiment of the invention.

FIG. 1 illustrates a system 100 configured in accordance with an embodiment of the invention. The system 100 includes a customer machine 102 in communication with a server 104 via a network 106, which may be any combination of wired and wireless networks. Large language model machines 150_1 through 150_N are also connected to network 106.

Customer machine 102 includes a processor 110 connected to input/output devices 112 via a bus 114. The input/output devices 112 may include a keyboard, mouse, touch display and the like. A network interface circuit 116 is also connected to the bus 114 to provide connectivity to network 106. A memory 120 is also connected to the bus 114. The memory 120 stores a customer module 122 with instructions executed by processor 110. The customer module 122 communicates with server 104. In particular, the customer module 122 provides product information to server 104 and receives from server 104 standards and testing information relevant to the product. Customer machine 102 may be a server, personal computer, tablet and the like.

Server 104 includes a processor 130, input/output devices 132, bus 134 and network interface circuit 136. A memory 140 is connected to bus 134. The memory stores instructions executed by processor 130 to implement operations disclosed herein. In one embodiment, the memory 140 stores a product prompt module 142 that creates prompts sent to customer machine 102 to specify characteristics of a product. The memory 140 also stores a standards module 144 with instructions executed by processor 130 to identify technical standards implicated by a specified product. The memory 140 also stores a natural language processing (NLP) module 146 to process clauses of technical standards implicated by the specified product. More particularly, the NLP module 146 uses natural language processing operations to produce technology standard document segments from technology standard documents.

The memory 140 also stores a graph module 148. The graph module 148 includes instructions executed by processor 130 to convert the technology standard document segments to a knowledge graph characterizing relationships between the technology standard document segments.

The memory 140 also stores a prompt module 150 with instructions executed by processor 130 to create prompts operative as inputs to large language models. The prompt module 150 utilizes the structure of the knowledge graph, regulatory compliance rules and product information to specify queries for technology standard document segments.

The memory 140 also stores a requirements module 152 with instructions executed by processor 130 to use output from the large language model to form probability ratings of requirements to test the product.

System 100 also includes large language model (LLM) machines 150_1 through 150_N. Machine 150_1 includes a processor 151 (a CPU or GPU), input/output devices 152, a bus 154 and a network interface circuit 156. A memory 160 is connected to bus 154. The memory 160 stores a LLM module 162 with instructions executed by processor 151 to implement a node of a large language model. The LLM module 162 processes prompts or queries from server 104 to produce technology standard document information that is used to form probability ratings of requirements to test a product. An embodiment of the invention uses a single LLM machine 150_1.

Figure 2:
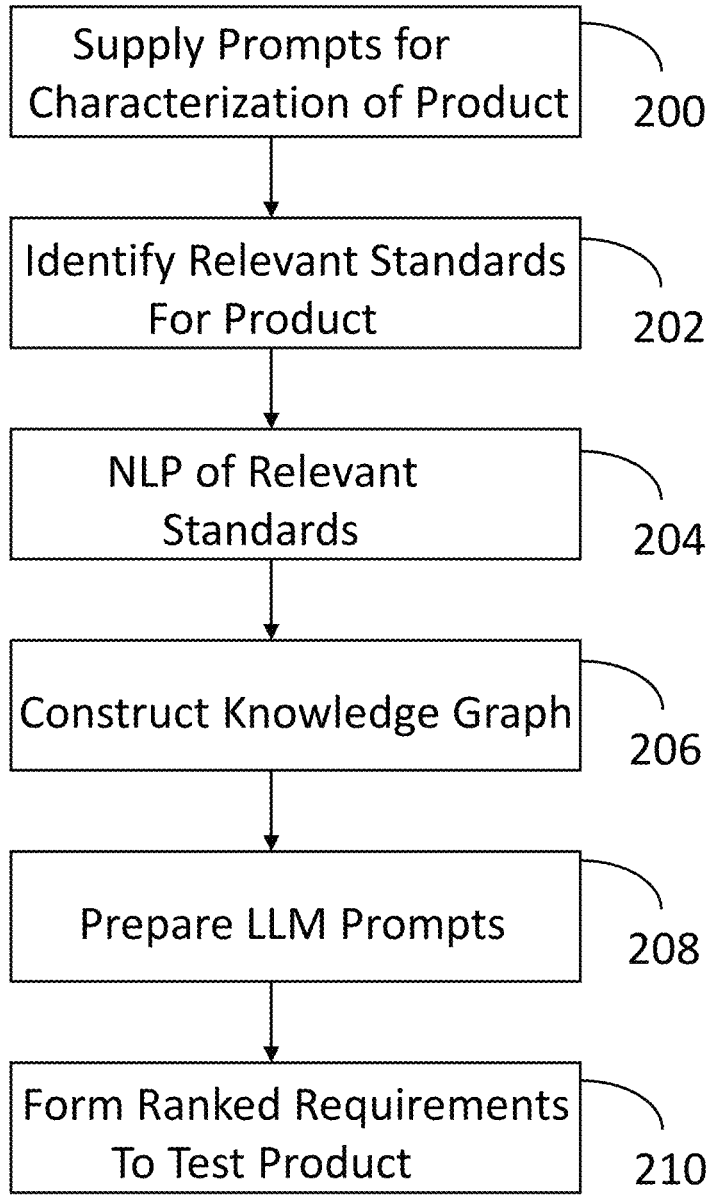
FIG. 2 illustrates processing operations performed in accordance with an embodiment of the invention.

FIG. 2 illustrates processing operations implemented by server 104. Prompts for characterization of a product are supplied 200. For example, the product prompt module 142 supplies prompts to customer machine 102 to characterize the nature of a product. In one embodiment, the prompts are a form that solicits information about the specifications of a device.

Relevant technology standards are then identified for the product 202. The standards module 144 may implement this operation using a rule-based system that determines device categorization and technology standards documents relevant to the device. The rule-based system may be configured using individuals with expertise on different standards. The rule-based system may also have automated components that identify relevant standards based upon certain key word matches and similar criteria. For example, if the product is characterized as an Infusion Pump of Type 5, then the following standards are implicated: IEC 60601-1 (general standard for medical electrical equipment) and IEC 60601-2-24 (particular standard for the basic safety and essential performance of infusion pumps and controllers).

Relevant technology standards documents are then subject to natural language processing 204. The NLP module 146 includes instructions executed by processor 130 to utilize regular expressions, Bidirectional Encoder Representations from Transformers (BERT) models, tokenization techniques and string manipulation. The NLP module 146 splits technology standards documents into sections and divides text into non-overlapping sections based on the topics covered. For example, a technology standards document may be in form of a Portable Document Format (PDF) that is broken into segments or chunks. Relevant pages are identified. Noisy text is removed. Table of contents processing is performed to identify relevant sections and the last section before an appendix. Header and footer information is removed so that only text from the original document remains. A mapping is created for each clause to its text.

The next operation of FIG. 2 is to construct a knowledge graph 206. The graph module 148 includes instructions executed by processor 130 to construct a knowledge graph as a hierarchical representation of relationships between technology standards document segments. In one embodiment, a data frame is created for each of the sections and tables in the text. For each section (row of the data frame) identify the clauses that are referenced within. The references are concatenated and added to a new column (children of the data frame). All external sources in each section are identified and added to the data frame. Nodes for each clause are created. Cross references between and across texts are created. The knowledge graph provides navigation through a document. The knowledge graph provides contextual information for a large language model. The contextual information shows the LLM how to read the text. Different documents may be merged using inheritance logic. In one embodiment, relationships between general standards, collateral standards and particular standards are defined.

Relationships in a document are defined through inheritance. Inheritance may be based upon inheriting from the line above a clause, from a sibling above or from a parent.

FIG. 3 illustrates text information 300 within a technology standards document. The hierarchical nature of the document is converted into a knowledge graph 302.

FIG. 4 illustrates a knowledge graph with a node 400 deemed to be mandatory because its associated text includes the term "shall". Node 402 is deemed mandatory through its dependence on node 400. Other nodes, such as node 404 are deemed not to be mandatory.

Figure 5:
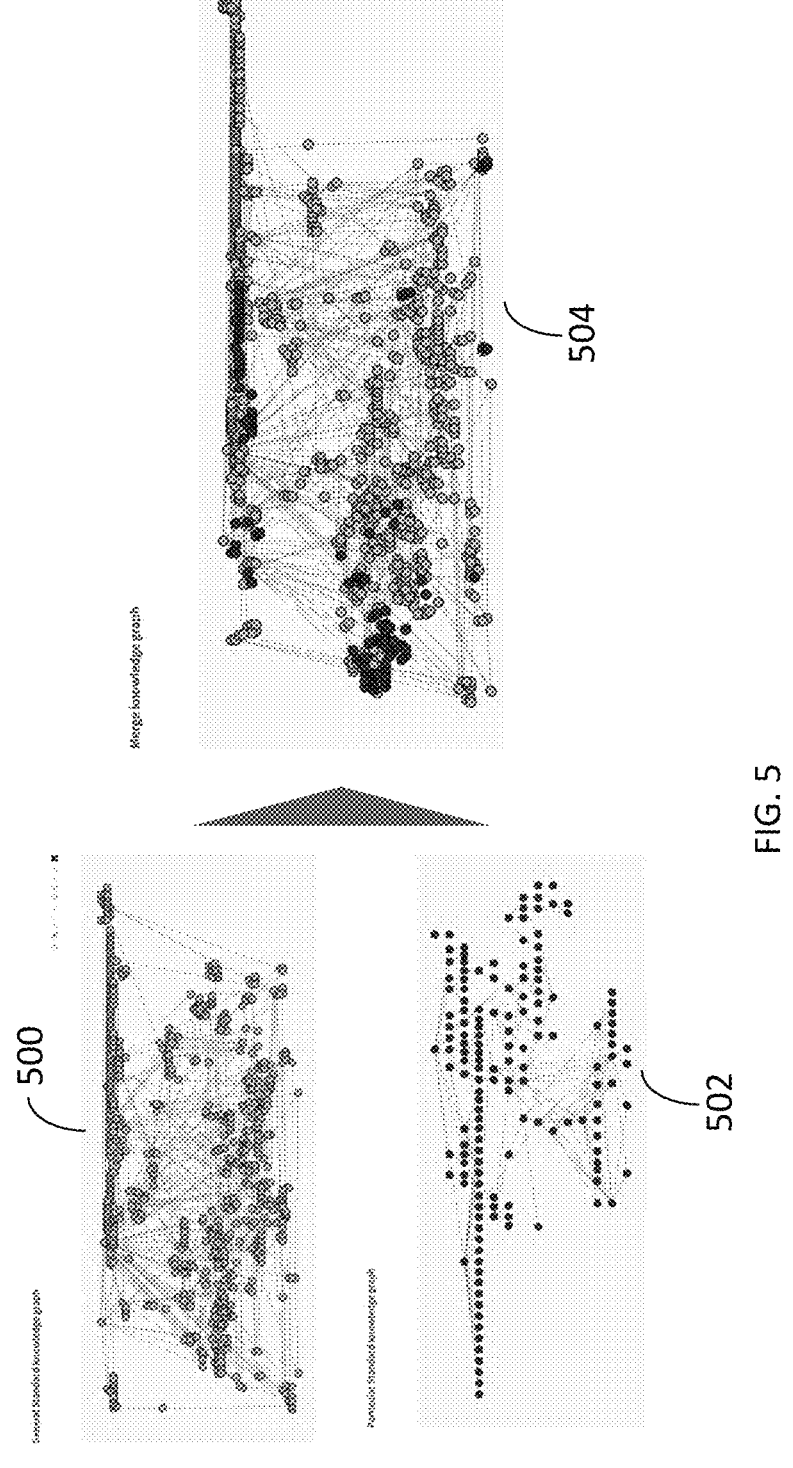
FIG. 5 illustrates merged knowledge graphs produced in accordance with an embodiment of the invention.

Related knowledge graphs may be merged. FIG. 5 illustrates a first knowledge graph 500 and a second knowledge graph 502. A merged knowledge graph 504 is formed to preserve relationships between common nodes of each of the graphs 500, 502. The merged knowledge graph 504 supplies exhaustive information about a given clause (node) that is referenced in the first knowledge graph 500 and the second knowledge graph 502.

The graph module 148 constructs a knowledge graph characterizing the hierarchical relationships of technology standard document segments. This graph may then be enhanced with additional features. Graph enhancement is achieved using a rule base. The rule base adds information about nodes and edges in the graph. For example, the rule base may assign indicators to label nodes associated with clauses. In one embodiment individual nodes associated with clauses are labeled as mandatory, verifiable, and applicable or not applicable. For example, in the case of Infusion Pump of Type 5, specific references to such a device are deemed more relevant than references to Infusion Pumps of Type 3 or Type 4. Edges in the graph may be weighted based upon dependency from an immediate parent node or higher ancestral node. For example, a mandatory node may have descendent edges and nodes that are highly weighted, whereas an applicable node may have descendent edges and nodes that are lightly weighted.

The next operation of FIG. 2 is to prepare LLM prompts 208. The prompt module 150 includes instructions executed by processor 130 to utilize the structure of the knowledge graph, regulatory compliance rules and product information to derive inputs for the large language model prompts for technology standard document segments.

The structure of the knowledge graph is used to identify significant nodes and paths within the knowledge graph that are fed into the large language model.

The regulatory compliance rules may be specified as a rule base derived from an expert with domain knowledge. For example, the rule base may include labelled examples of significant clauses, terms, and tests identified by the expert.

The product information may be the exemplary Infusion Pump of Type 5 and its mandatory attributes.

The prompt module 150 generates prompts that specify an expected output and expected formatting. Each prompt specifies specific tasks to perform and emphasizes the need for faithfulness. Further, the prompt should request a confidence score.

The following is an example of a prompt specifying formatting:

You are a JSON utility designed to extract structured information from documents. You can only return JSON and nothing else. The JSON must adhere to the format specified in the 'Output' structure provided below. Remember these rules:

Only use information from the provided text, and do not included anything else.

Assume that a regulatory expert will question you on how you gathered the information in your answer. Make sure to stick with the information provided.

If a piece of information is not in the text, use "null" for that field.

All text must be in UTF-8 format.

The JSON output should work with the json.loads( ) function.

Do not include any special characters like forward slashes or backslashes in the output.

Your main task is to read through documents related to regulatory standards like IEC and ISO, and determine if the document applies to the product within the list <<lists_of_products>>.

There are two ways for documents to apply or not to a product:

(1) generally: the document applies to all or no specific products.

(2) conditionally: the document applies to only specific subset of products that is identified by some characteristics.

These sections typically involve how a product is designed, which result in specified requirements. You will often see them phrased like this: "For [products] that [product characterization], [specified requirements]."

Return a confidence score between 0 and 1, where 0.0 indicates no confidence and 1.0 indicates high confidence that the text specified a requirement that is verifiable.

Determine if a specific clause is verifiable, i.e., states some form of check (by testing, review, inspection, functional test).

The prompt for the large language model may include a high confidence example, such as the following:

```
****************************************************************
Input:
   -Products = ["INFUSION PUMP"]]
   -Text = "INFUSTION PUMP type 5 shall be tested according to 201.12.1.102
to 201.12.1.105, as appropriate."
   Output: {
      "applicable": "conditionally",
      "explain_applicable": "text mentions INFUSION PUMP type 5",
      "product_characteristic": "type 5",,
      "specified_requirement": "tested according to 201.12.1.102 to 201.12.1.105,, as
appropriate",
      "type":"product characteristic",
      "explain_type":"product characteristic relates to the product design itself",
      "inclusion": true
      "explain_inclusion":"text specifies that requirement is applicable for
INFUSION PUMP type 5",
   }
}
****************************************************************
```

An example for the large language model may be in the form of an expert characterizing regulatory compliance rules. The following example shows a prompt that provides guidance in the form of comments based on how an expert would approach the understanding of a sentence for each field of interest.

```
****************************************************************
Test_extraction = {
   "title":string, #title, usually the first line of the text
   "measuring_method":string, #if the document specifically mentions the need to
measure something as a requirement, write a concise 60 word summary of what and how we
need to do measurements to validate the requirement; otherwise null
   "test_method":string, #if the document specifically mentions the need to test something
as a requirement, write a concise 60 word summary of what and how we need to test to validate
the requirement; otherwise null
   "observation_method":string #if the document specifically mentions the need to
measure something as a requirement, write a concise 60 word summary of what and how we
need to validate through inspection, specification or observation; otherwise null
   "confidence":float #float between 0 and 1 based on above fields whether the document
require verification, the more relevant information the higher the score.
   "explanation":string #explanation of the confidence score.
****************************************************************
```

The following is an exemplary prompt for specifying the form of the output. "Content" is a placeholder for contextual information that was derived from the knowledge graph.

```
****************************************************************
Extract exactly the above fields in one single JSON entry for the following document:
-----
""""
   +content
   +"""""
****************************************************************
```

6

The final operation of FIG. 2 is to form probability ratings of requirements to test the product 210. The requirements module 152 includes instructions executed by processor 130 to use the output from the large language model to form probability ratings of requirements to test the product. The probability ratings of requirements specify compliance actions needed to get a product to market. This may include testing, design, and validation to get a product to market. This may also include a design and development plan specifying actions to complete before submitting regulatory approval documentation.

The technology standard document segments specify different modes of verifications, such as tests, instruction manuals, and functional testing. A mandatory classification is assigned when text references "shall" or a similar term. An embodiment of the invention focuses on mandatory requirements and filters out requirements that do not meet this threshold.

The confidence score returned by the large language model can be used in the probability ratings process. In some instances, several factors are considered to assess whether a clause is relevant. In such cases, confidence scores are aggregated to form a composite confidence score used in the probability ratings process.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include but are not limited to: magnetic media, optical media, magneto-optical media, and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using an object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium with instructions executed by a processor to:

utilize natural language processing operations to produce technology standard document segments from a technology standard document;

convert the technology standard document segments to a knowledge graph characterizing relationships between the technology standard document segments;

utilize structure of the knowledge graph, regulatory compliance rules and product information to derive large language model prompts for technology standard document segments;

use output from the large language model to form probability ratings of requirements to test the product.

2. The non-transitory computer readable storage medium of claim 1 wherein the natural language processing operations include utilization of regular expressions, use of Bidirectional Encoder Representations from Transformers (BERT) models, tokenization techniques and string manipulation.

3. The non-transitory computer readable storage medium of claim 1 wherein the natural language processing operations process a table of contents to link table of contents parameters with textual clauses within the technology standard document.

4. The non-transitory computer readable storage medium of claim 3 further comprising instructions executed by the processor to form a data frame, where each row in the data frame includes a table of contents parameter and associated textual clause.

5. The non-transitory computer readable storage medium of claim 4 further comprising instructions executed by the processor to add a column to a row in the data frame to specify an external source identified in the associated textual clause and thereby form an augmented data frame.

6. The non-transitory computer readable storage medium of claim 5 further comprising instructions executed by the processor to form the knowledge graph from the augmented data frame.

* * * * *